United States Patent
Park

(10) Patent No.: US 10,824,129 B2
(45) Date of Patent: Nov. 3, 2020

(54) APPARATUS AND METHOD FOR MANUFACTURING CONTINUOUSLY TRANSPOSED CABLE USING MULTIPLE LINEAR ACTUATORS

(71) Applicants: SAM DONG CO., LTD., Chungcheongbuk-do (KR); Sun Gi Park, Chungcheongbuk-do (KR)

(72) Inventor: Sun Gi Park, Chungcheongbuk-do (KR)

(73) Assignee: SAM DONG CO., LTD., Chungcheongbuk-do (KR)

( * ) Notice: Subject to any disclaimer, the term of this patent is extended or adjusted under 35 U.S.C. 154(b) by 173 days.

(21) Appl. No.: 15/776,447

(22) PCT Filed: Nov. 8, 2016

(86) PCT No.: PCT/KR2016/012777
§ 371 (c)(1),
(2) Date: May 16, 2018

(87) PCT Pub. No.: WO2017/086641
PCT Pub. Date: May 26, 2017

(65) Prior Publication Data
US 2018/0329389 A1  Nov. 15, 2018

(30) Foreign Application Priority Data
Nov. 17, 2015  (KR) .................. 10-2015-0161188

(51) Int. Cl.
*H01B 13/02* (2006.01)
*H01B 13/00* (2006.01)
(Continued)

(52) U.S. Cl.
CPC ......... *G05B 19/182* (2013.01); *G05B 19/042* (2013.01); *G05B 19/409* (2013.01);
(Continued)

(58) Field of Classification Search
CPC ............... H01B 7/306; H01B 13/0278; H01B 13/0013; H01B 13/0036; G05B 19/042;
(Continued)

(56) References Cited

U.S. PATENT DOCUMENTS

| 6,995,311 B2 * | 2/2006 | Stevenson ................ G10H 1/02 84/654 |
| 2009/0118610 A1 * | 5/2009 | Karmarkar ............ A61M 39/08 600/420 |
| 2009/0183486 A1 * | 7/2009 | Beck .................. H01B 13/0278 57/66 |

* cited by examiner

*Primary Examiner* — Michael J Brown
(74) *Attorney, Agent, or Firm* — Patshegen IP LLC; Moshe Pinchas

(57) ABSTRACT

Disclosed is an apparatus and a method for producing a continuously transposed cable (CTC) by using a plurality of motors and a plurality of linear servo actuators instead of conventional apparatus and method for mechanically producing the continuously transposed cable by using a cam in the step of driving a continuously transposing head, which is the core of the manufacturing process of the continuously transposed cable. The apparatus comprises a continuously transposing head including at least four transposing devices; a control part being connected to the individual transposing devices in the continuously transposing head with wired or wireless connections; and a display input part for enabling a user to access and control it, the display input part being connected to the control part with wired or wireless connections, whereby the user can control the operation of the apparatus through the display input part, and continuously the control part can respectively control the individual transposing devices in the continuously transposing head in order to produce the continuously transposed cable.

12 Claims, 5 Drawing Sheets

(51) Int. Cl.
*G05B 19/042* (2006.01)
*G05B 19/409* (2006.01)
*H01F 41/06* (2016.01)
*G05B 19/18* (2006.01)
*H01B 7/30* (2006.01)

(52) U.S. Cl.
CPC ..... *H01B 13/0036* (2013.01); *H01B 13/0278* (2013.01); *H01F 41/06* (2013.01); *G05B 2219/37356* (2013.01)

(58) Field of Classification Search
CPC ................ G05B 19/182; G05B 19/409; G05B 2219/37356; H01F 41/06
USPC ........................................................ 700/126
See application file for complete search history.

APPARATUS AND METHOD FOR MANUFACTURING CONTINUOUSLY TRANSPOSED CABLE USING MULTIPLE LINEAR ACTUATORS

BACKGROUND OF THE INVENTION

1. Field of the Invention

The present invention is related to an apparatus and a method for producing a continuously transposed cable, and more particularly, to an apparatus and a method for producing a continuously transposed cable by using a plurality of motors and a plurality of linear servo actuators instead of conventional apparatus and method for mechanically producing the continuously transposed cable by using a cam in the step of driving a continuously transposing head, which is the core of the manufacturing process of the continuously transposed cable.

2. Description of the Prior Art

As is well known, Continuously Transposed Cable (CTC) consists of a number of rectangular cross-section copper wires worked by using cold working processes, which are made into an assembly and coated with an insulating varnish and thereafter they are usually over-wrapped with at least 5 to 84 strands of conductors in such a way that each is continuously transposed in turn without twist along its length and each conductor passing through every position, and finally they are coated with an insulating paper and other insulating materials. It is used mainly in the ultra high voltage transformer.

The continuously transposed cable as described above can contribute to reduce the load loss in the ultra high voltage transformer because it has advantages such as lower production costs, reduction in eddy current due to the multiple potential induced in a conductor, and reduction in circulation current due to the difference in length of each wire. Also, it can contribute greatly to enhance the cooling effectiveness after winding because it uses less the insulating paper compared to the normal square section copper wire. FIG. 1 shows a typical continuously transposed cable as described above.

This type of continuously transposed cable may be produced by using machine equipment. The machine equipment for producing the continuously transposed cable mainly comprises a cage strand machine for mounding line wires which are coated with enamel and have a number of strands required to construct the finished product of the continuously transposed cable, a continuously transposing head for forming the line wires into a square bundle after collecting the line wires prepared by the cage strand machine and simultaneously for continuously changing the electrical position of all line wires, an equipment for taping the square bundle with a variety of insulating materials in order to improve the insulation performance of the line wires, a caterpillar capstan for allowing the production work to be continuously performed by pulling the line wires, and a winding machine for making the finished product available for sale by winding it onto a bobbin.

FIG. 2 shows a general-type of the continuously transposing head (10) that is the most important device of the machine equipment for producing the continuously transposed cable. Hereinafter, the operating process and the drawback of the continuously transposing head (10) according to the prior art will be explained briefly.

As shown in FIG. 2, in order to produce the continuously transposed cable (CTC), the continuously transposing head (10) according to the prior art forms the line wires into a square bundle by receiving a plurality of line wires (C) from the cage strand machine (20) located behind it. At the same time, the continuously transposing head (10) makes the front part and the rear part of line wire (C) to be continuously transposed. In order to transpose the front part and the rear part of line wire (C), the continuously transposing head (10) must be designed to bend the line wire (C) by applying a physical force thereto. For this purpose, the continuously transposing head (10) includes a plurality of pushers (11) and a plurality of mechanical cams (12) for respectively driving the pushers (11), wherein the mechanical cam (12) is respectively installed in the pusher (11).

Meanwhile, there is one power source (13) for driving the plurality of mechanical cams (12). In order to drive the plurality of mechanical cams (12) by using one power source (13), a plurality of chains should be installed between the cam (12) and the power source (13), and between the cams (12) within a main body (14). If the power source (13) rotates, then the plurality of mechanical cams (12) begin to be operated so as to press the pusher (11) so that the line wire (C) can be bent by receiving any force applied to it.

However, there are several drawbacks in the conventional transposing scheme employing one power source (13) for driving the plurality of mechanical cams (12). At first, because all of the conventional continuously transposing heads (10) are mechanically operated, it is required to have a high skill of the operator. There are many variations such as the amount of the line wire (C) to be used according to various demands of the customer, the transposing pitch based on the size of the line wire (C), etc. in the continuously transposed cable (CTC). Considering this situation, at each time of performing another task, it is necessary to newly set up parameters of operation such as the mechanical travel distance between individual devices in the continuously transposing heads (10), the rotational speed of the power source (13), and the time difference of the operations between the plurality of mechanical cams (12), etc. For this purpose, an operator should completely set the parameters of operation by repeatedly adjusting the conventional continuously transposing heads (10). Accordingly, the operator must have a high level of proficiency to the conventional continuously transposing heads (10).

However, if the skill level of the operator drops, the potential to produce a defective product will be increased due to poor setting. Although the skill level of the operator is sufficiently high, a slight difference such as mechanical error may be occurred due to the nature of the mechanical and manual setting scheme. Consequently, it is hard to manufacture the ideally-standardized continuously transposed cable (CTC).

Another drawback of the conventional transposing scheme is that it is difficult to repair the conventional continuously transposing heads (10). Particularly, if the chain installed within the main body (14) is released or broken, it is required to take the main body (14) to pieces in order to replace the chain. As a result, unnecessary work is likely to be occurred so that the operation of the conventional continuously transposing heads (10) becomes uneconomical.

Other drawback of the conventional transposing scheme is that a large noise may be generated due to the operation of the plurality of mechanical cams (12) in the conventional continuously transposing heads (10).

In connection with the transposing scheme, a variety of prior arts have been published on patent documents.

For example, a technique related to the total manufacturing process of the continuously transposed cable is described in Korean Registered Patent No. 10-0139602 issued to Hyosung Power & Industrial Systems Performance Group Co., Ltd., on Mar. 4, 1998, titled "Manufacturing method for continuous potential winding". This technique corresponds to the prior art which can be sufficiently overcome by the present invention.

Furthermore, a continuously transposed wire formed by transposing a plurality of line wires together is described in Korean Laid-open Patent Publication No. 10-2014-0024286 in the name of ASIA Elektrodraht GmbH, on Feb. 28, 2014, titled "Continuously transposed conductor". Since this prior art mainly relates to the continuously transposed conductor, it is different from the present invention that relates to the apparatus for producing a continuously transposed cable.

Furthermore, an apparatus and method for forming wound cables that involves minimal bending of the conductor elements is described in U.S. Pat. No. 7,980,051 B2, issued to General Cable Superconductors Limited, on Jul. 19, 2011, titled "Apparatus and method for producing composite cable". Since this US patent mainly relates to the method for winding various conductor cables together, this technique is different from the present invention that relates to the apparatus for producing a continuously transposed cable.

Furthermore, other technologies mainly related to the continuously transposed conductor itself have been disclosed in other patent documents—see Korean Laid-open Patent Publication No. 10-2009-0034786 in the name of Essex Europe SAS, on Apr. 8, 2009, titled "Electrical transposed conductor"; Korean Laid-open Patent Publication No. 10-2013-0111222 in the name of Essex Europe SAS, on Oct. 10, 2013, titled "Method for producing of an electrical winding, and electrical conductor"; and Korean Laid-open Patent Publication No. 10-2012-0094014 in the name of Essex Europe SAS, on Aug. 23, 2012, titled "Continuously transposed conductor". Since these prior arts mainly relate to the continuously transposed conductor, they are different from the present invention that relates to the apparatus for producing a continuously transposed cable.

Finally, an apparatus and a method for producing windings to be used in the transformer are described in International Application No. PCT/AT1992/000143 in the name of ASIA GESELLSHAFT M.B.H., et al., on Sep. 11, 1992, titled "Process and device for producing transformer windings". Since this technique mainly relates to the total process for producing the continuously transposed windings, it corresponds to the prior art which can be sufficiently overcome by the present invention.

SUMMARY OF THE INVENTION

Accordingly, the present invention has been made with a view to overcoming the foregoing problems of the prior arts. It is an object of the present invention provides an apparatus and a method for producing a continuously transposed cable (CTC) by using a plurality of motors and a plurality of linear servo actuators instead of conventional apparatus and method for mechanically producing the continuously transposed cable by using a cam in the step of driving a continuously transposing head. According to the present invention, it is possible to bend each of wires at desired amount and width (or gap and shape). Furthermore, it is possible to reduce noise and to precisely set the continuously transposing head by simply inputting numerical values or simply changing them. Since the entered numerical values can be reused, it is possible to produce the standardized continuously transposed cable.

In accordance with an aspect of the present invention, there is provided an apparatus for producing a continuously transposed cable (CTC), the apparatus comprising:

a continuously transposing head including at least four transposing devices;

a control part being connected to the individual transposing devices in the continuously transposing head with wired or wireless connections; and a display input part for enabling a user to access and control it, the display input part being connected to the control part with wired or wireless connections, whereby the user can control the operation of the apparatus through the display input part, and continuously the control part can respectively control the individual transposing devices in the continuously transposing head in order to produce the continuously transposed cable (CTC).

Preferably, the transposing devices in the continuously transposing head comprise six transposing devices.

The transposing devices respectively comprise:

a pusher for directly applying a physical force to the continuously transposed cable (CTC) in order to mechanically process the continuously transposed cable (CTC);

an actuator for providing the pusher with the physical force;

a motor for driving the actuator; and a driver for controlling the operation of the motor;

wherein the driver in the individual transposing devices is respectively connected to the control part with wired or wireless connections, and whereby the driver can control the motor associated with it in accordance with a control signal from the control part.

The control part is provided with a processing unit and a memory unit, in which a control program for controlling the continuously transposing head is loaded on the control part and it provides a program interface that is a control menu provided on the display input part.

The display input part comprises a touch screen, in which the program interface provides the user with means for operating the control program through the display input part so that the user may operate the control program.

A plurality of switches are installed a body of the apparatus, in which the switches comprise an all axis home switch for opening all of the individual transposing devices, an all stand by switch for preparing the operation of all of the individual transposing devices, a middle enter switch for respectively storing a set values individually set for each of transposing devices, a stroke enter switch for storing total set values for all of transposing devices, the total set values being the sum of each of set values individually set, and a plurality of setting switches for respectively setting each of the transposing devices.

The all axis home switch, the all stand by switch, the middle enter switch, the stroke enter switch and the plurality of setting switches may be provided to the user as contained in the program interface.

The control program may selectively control the apparatus according to three modes including a SET-mode, a SYNC-mode and a RUN-mode.

The control program stores set values in the memory unit of the control part in case that the user wants to store set values by using the middle enter switch or the stroke enter switch after completing individual controls of each of transposing devices, and then the control program may provide the user with the stored set values via the program interface so as to enable the user to use them.

The control part is connected to a cage strand for providing the transposing devices with the continuously transposed cable (CTC) with wired or wireless connections, and whereby the control part may receive information including the size and the number of strands of wire in the continuously transposed cable (CTC) from the cage strand and then it may control each of transposing devices by using such information.

In accordance with another aspect of the present invention, there is provided a method for producing a continuously transposed cable (CTC) by operating the apparatus as described above, the method comprising the following steps:

(S1): activating a SET-mode so as to execute the SET-mode;

(S2): opening the continuously transposing head;

(S3): setting a mode to determine whether each of transposing devices in the continuously transposing head is individually set or whether each of transposing devices is automatically set by a control program;

(S4): inputting numerical values associated with the continuously transposed cable (CTC) to be produced in the case that each of transposing devices is automatically set by the control program in the step (S3);

(S5): preparing the continuously transposing head;

(S6): executing a RUN-mode;

(S7): manufacturing the continuously transposed cable (CTC);

(S8): detecting whether a problem occurs or not during the execution of the step (S7);

(S9): activating a SYNC-mode in the case that a problem has been detected in the step (S8) or in the cast that the user wants to set individually each of transposing devices in the step (S3);

(S10): setting each of transposing devices;

(S11): storing a set value individually set for each of transposing devices; and (S12): storing total set values for all of transposing devices, in which the total set values is the sum of each of set values individually set;

wherein the step (S5) is performed after completing the step (S12) and whereby the continuously transposed cable (CTC) may be manufactured according to the order of the steps as mentioned above.

The numerical values are the size, the number of strands, transposing pitch of wire that makes up the continuously transposed cable (CTC).

According to the present invention, it is possible to freely control the size, the number of strands, transposing pitch of wire that makes up the continuously transposed cable (CTC) by simply changing numerical values on the touch screen that can be accessed by the user for adjustment. As a result, accurately standardized wires can be produced. Since the stored numerical values can be reused, it is possible to greatly improve the efficiency of the work and to greatly reduce the burden on the operator and the preparation time. Since the apparatus for producing the continuously transposed cable (CTC) can be made even smaller and the pusher can be operated individually by a small electric motor, so it can quickly respond to any fault and to greatly reduce noise.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
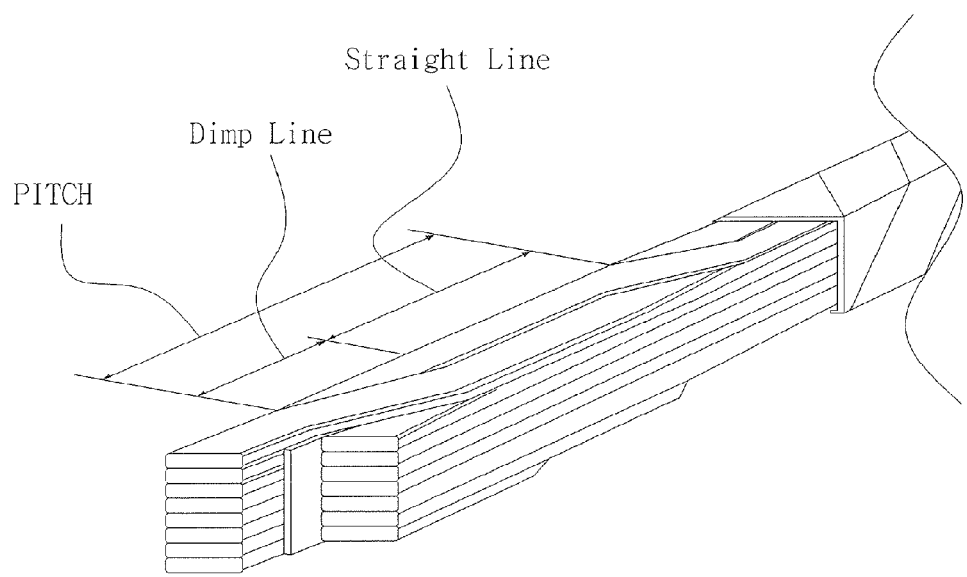
FIG. 1 is a perspective view of a continuously transposed cable.
Figure 2:
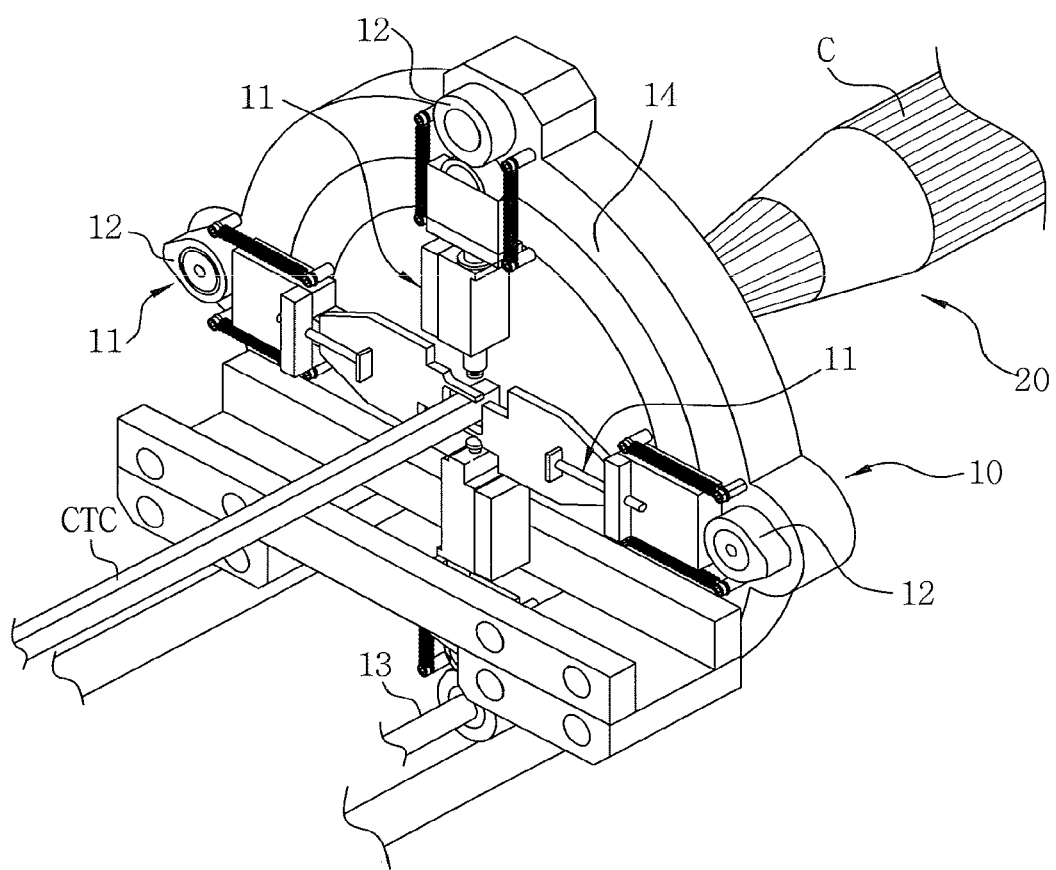
FIG. 2 is a perspective view of an apparatus for producing the continuously transposed cable according to the prior art.

The drawings in the present application and their accompanying detailed description are directed to merely an example embodiment of the invention. The advantages and other features of the instruments and methods disclosed herein will become more readily apparent to those having ordinary skill in the art from the following detailed description of certain preferred embodiment taken in conjunction with the drawings which set forth representative embodiment of the present invention. It should be borne in mind that, unless noted otherwise, like or corresponding elements among the figures may be indicated by like or corresponding reference numerals.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

All relative descriptions herein such as left, right, up, and down are with reference to the Figures, and not meant in a limiting sense. The illustrated embodiment can be understood as providing exemplary features of varying detail of certain embodiment, and therefore, features, components, modules, elements, and/or aspects of the illustrations can be otherwise combined, interconnected, sequenced, separated, interchanged, positioned, and/or rearranged without materially departing from the disclose systems or methods. The shapes and sizes of components are also exemplary and unless otherwise specified, can be altered without materially affecting or limiting the disclosed technology.

Hereinafter, the constitutional elements and the operation of the apparatus for producing a continuously transposed cable according to the preferred embodiment of the present invention will be explained in detail.

Figure 3:
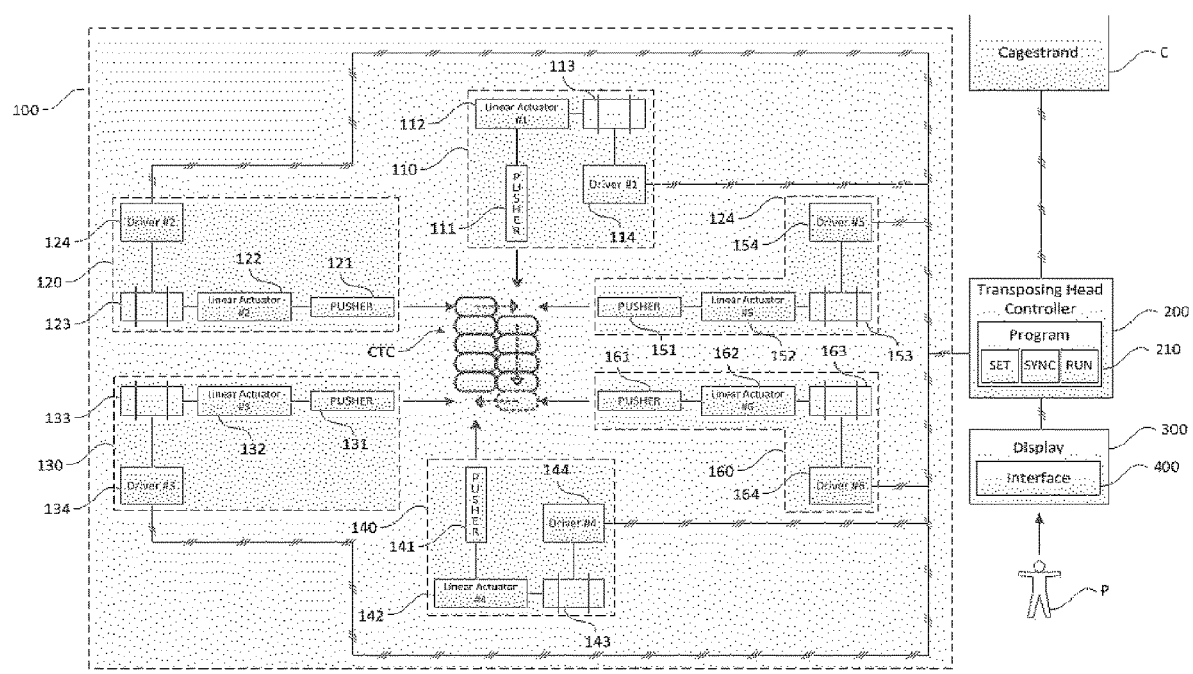
FIG. 3 is a schematic representation of an apparatus for producing a continuously transposed cable according to a preferred embodiment of the present invention, for showing total structure thereof.

FIG. 3 schematically illustrates total structure of the apparatus for producing a continuously transposed cable by employing a liner actuator according to the present invention.

Referring to FIG. 3, according to the present invention, it is with this mind that there are six pushers (111, 121, 131, 141, 151, 161) for applying a physical impact to a copper wire to be introduced into the apparatus in order to manufacture any desired-shape of a continuously transposed cable (CTC). In general, at least four pushers may be installed within the apparatus in order to manufacture the continuously transposed cable (CTC). However, if four pushers are installed within the apparatus, the error rate may be increased rapidly in the manufacturing process of the continuously transposed cable (CTC). Accordingly, as described above, it is most preferable to employ six pushers in the apparatus in terms of the safety and the reliability of the manufacturing process. Hereinafter, the apparatus (1000) for producing the continuously transposed cable by employing six pushers (111, 121, 131, 141, 151, 161) will be described below as an example.

As shown in FIG. 3, the apparatus (1000) for producing the continuously transposed cable according to the present invention comprises a continuously transposing head (100), a control part (200) and a display input part (300). A supervisor or a user (P) can control the continuously transposing head (100) and the control part (200) by operating the display input part (300).

To describe such constitutional elements in detail, the continuously transposing head (100) includes six transposing devices (110, 120, 130, 140, 150, 160). These transposing devices (110, 120, 130, 140, 150, 160) respectively comprise pushers (111, 121, 131, 141, 151, 161), actuators (112, 122, 132, 142, 151, 162), motors (113, 123, 133, 143, 153, 163), and drivers (114, 124, 134, 144, 154, 164).

The configuration and the operation of the constitutional elements in the six transposing devices (110, 120, 130, 140, 150, 160) as described above are identical to each other. Accordingly, the role and the operational relationship of the four constitutional elements in the six transposing devices (110, 120, 130, 140, 150, 160) will be described by adopting the first transposing device (110) as a representative example.

At first, the first pusher (111) of the first transposing device (110) acts as a pin for applying a physical force to the continuously transposed cable (CTC) along the direction of the arrow in order to create a desired shape of the continuously transposed cable (CTC).

The first pusher (111) is installed at a position adjacent to the first actuator (112) for providing the first pusher (111) with a physical force. Preferably, the first actuator (112) comprises a linear actuator. The first pusher (111) receives a physical force from the first actuator (112) and then transfers it to the continuously transposed cable (CTC) so as to mechanically process the continuously transposed cable (CTC) at the desired shape.

The first actuator (112) is driven by the first motor (113), and the operation of the first motor (113) is controlled by the first driver (114). All drivers (114, 124, 134, 144, 154, 164) may be connected to the control part (200) with wired or wireless connections and thereby they can operate in accordance with the control signal from the control part (200).

To sum up, in the apparatus (1000) for producing the continuously transposed cable according to the present invention, the control signal is sent from the control part (200) to the drivers (114, 124, 134, 144, 154, 164) and in turn the drivers (114, 124, 134, 144, 154, 164) respectively operate the motors (113, 123, 133, 143, 153, 163) connected thereto and the actuators (112, 122, 132, 142, 151, 162) connected to the motors (113, 123, 133, 143, 153, 163). Continuously, the pushers (111, 121, 131, 141, 151, 161) mechanically connected with the actuators (112, 122, 132, 142, 151, 162) operate so as to mechanically process the continuously transposed cable (CTC) introduced into the continuously transposing head (100) at the desired shape. Consequently, it is possible to produce the continuously transposed cable (CTC) having a transposing pitch and a transposed shape what the supervisor or the user (P) intends to do.

Meanwhile, the control part (200) is connected to the display input part (300) with wired or wireless connections, in which the display input part (300) provides an interface that can be operated by the supervisor or the user (P). Therefore, the supervisor or the user (P) can control or operate the control part (200) which plays a role of operating the continuously transposing head (100) comprising six transposing devices (110, 120, 130, 140, 150, 160). A control program (210) for controlling the continuously transposing head (100) is loaded on the control part (200). Preferably, the control program (210) provides a program interface (400) for allowing the supervisor or the user (P) to input control numerical values through the display input part (300). For this purpose, it is preferred that the control part (200) comprises a computer including a processing unit such as CPU, MPU, etc. and a memory unit such as RAM, ROM, etc.

As described above, the control part (200) may be configured as a computer and the continuously transposing head (100) may be controlled by the control program (210) and the program interface (400). Alternatively, the control part (200) may be constituted by an electric circuit or it may be constituted by parts mechanically connected to each other.

Hereinafter, the process of controlling the continuously transposing head (100) due to the linkage operation between the control part (200) configured as a computer, the control program (210) and the program interface (400) will be explained in detail. It should be appreciated by one of ordinary skill that the former and the latter described above have only a difference in configuration but their control scheme is the same.

Figure 4:
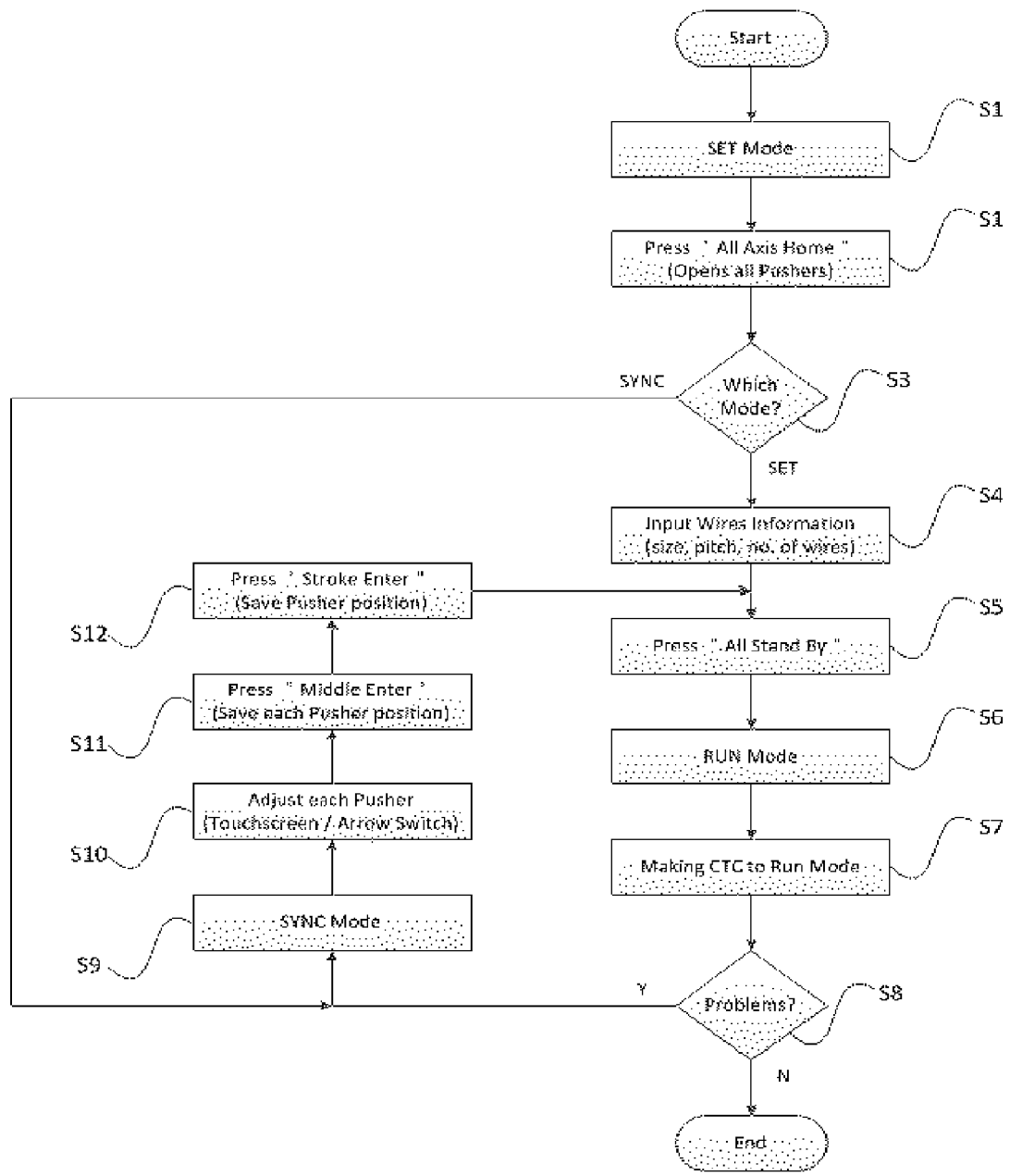
FIG. 4 is a flow chart for illustrating a control process to be executed in the apparatus for producing a continuously transposed cable according to the preferred embodiment of the present invention.

The process of controlling the continuously transposing head (100) by the control part (200) will be explained with reference to the drawings FIG. 3, FIG. 4 and FIG. 5. FIG. 4 is a flow chart for illustrating the process of controlling the continuously transposing head (100), and FIG. 5 is a schematic representation for showing the relationship structure between the program interface (400) provided on the display input part (300) and the control program (210) of the control part (200).

Before explaining about the process, it is to be understood that the apparatus (1000) for producing the continuously transposed cable according to the present invention may be operated in three modes, that is, "SET-mode", "SYNC-mode" and "RUN-mode" in accordance with the control program (210).

Figure 5:
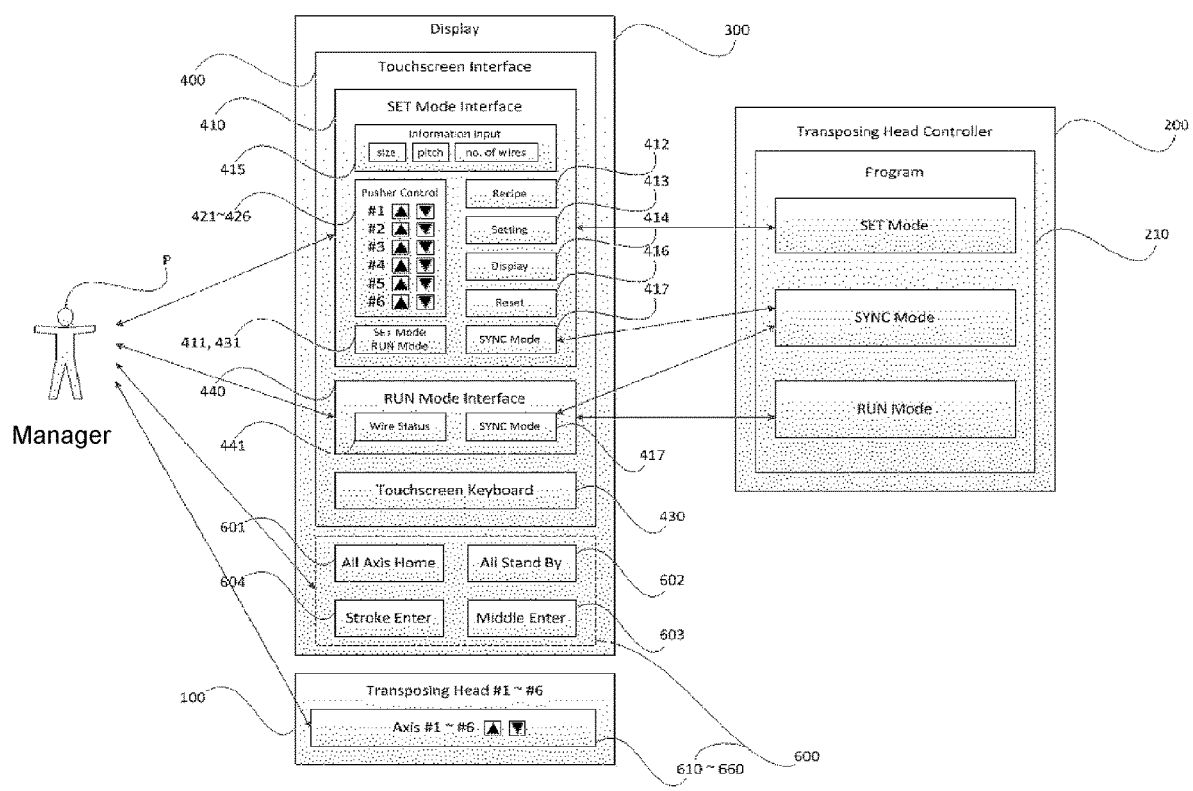
FIG. 5 is a schematic representation for showing a relationship structure between constitutional elements in the apparatus for producing a continuously transposed cable according to the preferred embodiment of the present invention.

Referring to FIG. 5, a plurality of switches (600) comprise an all axis home switch (601), an all stand by switch (602), a middle enter switch (603), a stroke enter switch (604), and a plurality of setting switches (610~660) for respectively setting the transposing devices (110, 120, 130, 140, 150, 160). The switches (601~604) other than the setting switches (610~660) of all the switches (600) can be installed directly on the apparatus without being provided on the display input part (300) in consideration of the importance of the role or the convenience of operation. Alternatively, they may be directly provided on the display input part (300) in consideration of the convenience of the user and the need for integrated management. In connection with this, a manufacture can adopt the installation method of the switches with considering the user's convenience in advance.

Each of the setting switches (610~660) may be respectively installed in each of the transposing devices (110, 120, 130, 140, 150, 160) to be respectively controlled by them.

Herein below the operation of the apparatus (1000) for producing the continuously transposed cable according to the present invention will be explained with reference to FIG. 4. At first, the supervisor or the user (P) must adjust the transposing pitch, the extent to which the wire is transposed, etc. for each transposing devices (110, 120, 130, 140, 150, 160) before operating the apparatus (1000). In this regard, in the conventional apparatus, all such settings had to be performed mechanically. In contrast, in the apparatus (1000) according to the present invention, all such settings may be easily performed through the SET-mode. Accordingly, the supervisor or the user (P) performs a SET-mode activation step (S1) for activating the SET-mode of the apparatus (1000). For this purpose, if supervisor or the user (P) begins to operate the apparatus (1000), a SET-mode interface (410) as shown in FIG. 5 may be display on the display input part (300). Then, the supervisor or the user (P) completes the SET-mode activation step (S1) by activating a SET-mode button (411).

Meanwhile, the supervisor or the user (P) may add separate input devices such as a mouse or a keyboard, etc., to the apparatus (1000), or he or she may install a lever or a switch on the display input part (300) in order to perform control operations such as clicking the program interface (400) or inputting numerical values, etc. However, it is preferable to configure the display input part (300) as a touch screen so as to enable the supervisor or the user (P) to easily operate the program interface (400).

Hereinafter, an example in which the display input part (300) is configured as a touch screen will be described.

When the display input part (300) is configured as a touch screen, it is preferable to provide a separate touch screen keyboard (430) for inputting various numerical values.

At first, the supervisor or the user (P) activates the apparatus (1000) at the SET-mode by pressing the SET-mode button (411) and then he or she performs a transposing device opening step (S2) for opening the transposing devices (110, 120, 130, 140, 150, 160) by pressing the all axis home switch (601) among the plurality of switches (600).

After performing the transposing device opening step (S2), the supervisor or the user (P) must adjust the operation position and the operation cycle of the transposing devices (110, 120, 130, 140, 150, 160) according to the requirements of the continuously transposed cable (CTC) to be manufactured. According to the control program (210) of the apparatus (1000), in the SET-mode, it is possible to automatically calculate and set the operating pressure and the operation cycle of the transposing devices (110, 120, 130, 140, 150, 160) based on three numerical values such as the size and the number of strands of wire, the transposing pitch in the continuously transposed cable (CTC) to be manufactured by inputting the above numerical values without performing any separate individual adjustment.

The term "the size of wire" may refer to numerical information covering the thickness and the width of individual wire making up the continuously transposed cable (CTC).

Meanwhile, the supervisor or the user (P) can respectively control the operational position of the transposing devices (110, 120, 130, 140, 150, 160) at the SYNC-mode in the apparatus (1000) for producing the continuously transposed cable according to the present invention.

Therefore, the supervisor or the user (P) first determines one step of either of two steps by first performing a mode selection step (S3) for determining whether to execute the apparatus (1000) in the SET-mode or the SYNC-mode.

If the supervisor or the user (P) wants to perform the apparatus (1000) in the SET-mode, he or she performs a numerical value inputting step (S4) for inputting three numerical values, that is, the size and the number of strands of wire, the transposing pitch in the continuously transposed cable (CTC) as described above. The display input part (300) includes a numerical value display unit (415) for allowing the supervisor or the user (P) to input numerical values, in which the numerical value display unit (415) may display the thickness and the width of strands of wire, numbers of strands of wire, the transposing pitch, which have already entered by the supervisor or the user (P).

Meanwhile, a SYNC-mode button (417) for activating the SYNC-mode is provided on the SET-mode interface (410). If the supervisor or the user (P) activates the SYNC-mode button (417), a SYNC-mode activation step (S9) begins to be performed. This will be further explained below.

When all of numerical values associated with the continuously transposed cable (CTC) are entered as a result of completing the numerical value-inputting step (S4), the supervisor or the user (P) performs a preparing step (S5) for activating the all stand by switch (602) among the plurality of switches (600) so that the continuously transposing head (100) whose setting is completed is set to the operation ready state.

When the preparing step (S5) is performed as such, the SET-mode button (411) is changed to a RUN-mode button (431) and thereby the supervisor or the user (P) finds that he or she is ready to perform the RUN-mode. Then, the supervisor or the user (P) can perform a RUN-mode step (S6) by pressing the RUN-mode button (431).

By performing the RUN-mode step (S6) as such, it is possible to perform a manufacturing step (S7) for manufacturing the continuously transposed cable (CTC) by operating the continuously transposing head (100). At this time, the supervisor or the user (P) can ascertain the set status and the manufacturing status of the continuously transposed cable (CTC) through an operation interface (440) provided by the display input part (300). The supervisor or the user (P) can also ascertain the entered numerical values by seeing a wire status display window (441) with the naked eye. In the manufacturing step (S7), the adjustment of the continuously transposing head (100) becomes impossible.

Since the SYNC-mode button (417) is provided on the operation interface (440), the supervisor or the user (P) can change the operation mode of the apparatus (1000) from the RUN-mode to the SYNC-mode. If a problem detecting step (S8) for detecting problems such as a manufacturing defect or a device error during the performing the manufacturing step (S7) of the continuously transposed cable (CTC) is activated, the supervisor or the user (P) activates the SYNC-mode button (417) in order to enable the apparatus (1000) to be changed to the SYNC-mode. Thereby, the manufacturing operation of the continuously transposed cable (CTC) is interrupted and then a SYNC-mode activation step (S9) begins to be performed. Alternatively, if the supervisor or the user (P) activates the SYNC-mode button (417) in the mode selection step (S3), the SYNC-mode activation step (S9) may be performed.

When the SYNC-mode activation step (S9) is performed, the supervisor or the user (P) can respectively control the operational position of the transposing devices (110, 120, 130, 140, 150, 160). In detail, as shown in FIG. 5, the supervisor or the user (P) can respectively the operational position of the transposing devices (110, 120, 130, 140, 150, 160) by operating the setting switches (610~660) installed therein. Alternatively, the supervisor or the user (P) can respectively the operational position of the transposing devices (110, 120, 130, 140, 150, 160) by operating setting buttons (421~426) on the SET-mode interface (410) provided by the display input part (300). It should be appreciated by one of ordinary skill that both of these schemes may be employed, or only one of them may be employed.

In an individual transposing device control step (S10), the supervisor or the user (P) may manually respectively control the transposing devices (110, 120, 130, 140, 150, 160) by using the above schemes. After performing the individual transposing device control step (S10), an individual transposing device storing step (S11) for respectively storing an individual setting respectively associated with the transposing devices (110, 120, 130, 140, 150, 160) may be performed. This step (S11) can be performed by pressing the middle enter switch (603) after completing the control of any one of the transposing devices (110, 120, 130, 140, 150, 160).

After completing all of the controls, a total transposing device storing step (S12) for storing total current setting status of the continuously transposing head (100) may be performed. This step (S12) can be performed by pressing the stroke enter switch (604) after completing all of the controls associated with the continuously transposing head (100).

After performing the total transposing device storing step (S12), the continuously transposing head (100) becomes a state in which the setting for manufacturing the continuously transposed cable (CTC) is completed. Then, the supervisor or the user (P) may perform the preparing step (S5) and the subsequent steps to manufacture the continuously transposed cable (CTC).

Since the control part (200) is connected to a cage strand (C) for providing the continuously transposed cable (CTC) with wired or wireless connections, it may determine whether the cage strand (C) provides the continuously transposing head (100) with the continuously transposed cable (CTC) or not. Furthermore, the control part (200) may receive information such as the supply status and the scheduled supply of the continuously transposed cable (CTC) and then it may control the continuously transposing head (100) by using such information.

Meanwhile, the display input part (300) may comprise LED or LCD monitors. Alternatively, the display input part (300) may comprise FND(=Flexible Numeric Display) input part. The program interface (400) can receive numerical values in various ways such as an input method using a touch screen or another input method using an external input device such as a keyboard. Alternatively, the program interface (400) can receive numerical values by simply using the switch or the lever as described above.

The apparatus (1000) for producing the continuously transposed cable according to the present invention can store information such as the size, the pitch and the number of strands of wire and then it can quickly apply the information to the manufacturing process of the continuously transposed cable (CTC) so as to secure the work convenience. For this purpose, the control program (210) has the function of storing and retrieving the information related to numerical values through the processing device and the storage device thereof. It should be appreciated by one of ordinary skill that this can be accomplished by using conventional techniques.

Preferably, the display input part (300) also provide the interface for allowing the supervisor or the user (P) to use the function of storing and retrieving information related to numerical values. This can be done via the three buttons (412, 413, 414) provided by the SET-mode interface (410). In detail, the recipe button (412) is a button for allowing the supervisor or the user (P) to search a list of past settings previously stored. If the supervisor or the user (P) pushes the recipe button (412), a separate window for showing the list of past settings will appear on the window as shown in FIG. 5. The supervisor or the user (P) can select the setting in which he or she wants to use from the list of past settings by using the touch screen. Then, the supervisor or the user (P) can apply the setting by pressing the setting button (413). The supervisor or the user (P) can change the display screen to return to the SET-mode screen as shown in FIG. 5 by pressing the return button (414). The function of storing and retrieving information related to numerical values may be performed the numerical value inputting step (S4) among the steps as illustrated in FIG. 4.

The setting of the continuously transposing head (100) may automatically stored in accordance with the control program by pressing the middle enter switch (603) and the stroke enter switch (604).

A reset button (416) provided on the SET-mode interface (410) is a button capable of performing the function to initialize all settings.

Although the invention is described with respect to specific embodiments, the principles of the invention, as defined by the claims appended herein, can obviously be applied beyond the specific embodiments of the invention described herein. The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

BRIEF DESCRIPTION OF REFERENCE NUMBERS IN THE DRAWINGS

1000: apparatus for producing the continuously transposed cable
100: continuously transposing device
110, 120, 130, 140, 150, 160: transposing device
111, 121, 131, 141, 151, 161: pusher
112, 122, 132, 142, 152, 162: actuator
113, 123, 133, 143, 153, 163: motor
114, 124, 134, 144, 154, 164: driver
200: control part
210: control program
300: display input part
400: program interface
410: SET-mode interface
411: SET-mode button
412: recipe button
413, 421~426: setting button
414: return button
415: numerical value display unit
416: reset button
417: SYNC-mode button
431: RUN-mode button
440: operation interface 441: wire status display unit
600: switches
601: all axis home switch
602: all stand by switch
603: middle enter switch
604: stroke enter switch
610~660: transposing device setting switch
S1: SET-mode activation step
S2: transposing device opening step
S3: mode setting step
S4: numerical value inputting step
S5: preparing step
S6: RUN-mode step
S7: manufacturing step
S8: problem detecting step
S9: SYNC-mode activation step
S10: individual transposing device control step
S11: individual transposing device storing step
S12: total transposing device storing step

What is claimed is:

1. An apparatus for producing a continuously transposed cable (CTC), the apparatus comprising:
   a continuously transposing head including at least four transposing devices;
   a control part being connected to the individual transposing devices in the continuously transposing head with wired or wireless connections; and
   a display input part for enabling a user to access and control it, the display input part being connected to the control part with wired or wireless connections,
   whereby the user can control the operation of the apparatus through the display input part, and continuously the control part can respectively control the individual transposing devices in the continuously transposing head in order to produce the continuously transposed cable (CTC).

2. The apparatus as claimed in claim 1, wherein the transposing devices in the continuously transposing head comprise six transposing devices.

3. The apparatus as claimed in claim 1, wherein the transposing devices respectively comprise:
   a pusher for directly applying a physical force to the continuously transposed cable (CTC) in order to mechanically process the continuously transposed cable (CTC);
   an actuator for providing the pusher with the physical force;
   a motor for driving the actuator; and
   a driver for controlling the operation of the motor;
   wherein the driver in the individual transposing devices is respectively connected to the control part with wired or wireless connections, and whereby the driver can control the motor associated with it in accordance with a control signal from the control part.

4. The apparatus as claimed in claim 1, wherein the control part is provided with a processing unit and a memory unit, in which a control program for controlling the continuously transposing head is loaded on the control part and it provides a program interface that is a control menu provided on the display input part.

5. The apparatus as claimed in claim 4, wherein the display input part comprises a touch screen, in which the program interface provides the user with means for operating the control program through the display input part so that the user may operate the control program.

6. The apparatus as claimed in claim 4, wherein the control program may selectively control the apparatus according to three modes including a SET-mode, a SYNC-mode and a RUN-mode.

7. The apparatus as claimed in claim 4, wherein the control program stores set values in the memory unit of the control part in case that the user wants to store set values by using the middle enter switch or the stroke enter switch after completing individual controls of each of transposing devices, and then the control program may provide the user with the stored set values via the program interface so as to enable the user to use them.

8. The apparatus as claimed in claim 4, wherein the control part is connected to a cage strand for providing the transposing devices with the continuously transposed cable (CTC) with wired or wireless connections, and whereby the control part may receive information including the size and the number of strands of wire in the continuously transposed cable (CTC) from the cage strand and then it may control each of transposing devices by using such information.

9. The apparatus as claimed in claim 1, wherein a plurality of switches are installed a body of the apparatus, in which the switches comprise an all axis home switch for opening all of the individual transposing devices, an all stand by switch for preparing the operation of all of the individual transposing devices, a middle enter switch for respectively storing a set values individually set for each of transposing devices, a stroke enter switch for storing total set values for all of transposing devices, the total set values being the sum of each of set values individually set, and a plurality of setting switches for respectively setting each of the transposing devices.

10. The apparatus as claimed in claim 9, wherein the all axis home switch, the all stand by switch, the middle enter switch, the stroke enter switch and the plurality of setting switches may be provided to the user as contained in the program interface.

11. A method for producing a continuously transposed cable (CTC), the method comprising the following steps:
   (S1): activating a SET-mode so as to execute the SET-mode;
   (S2): opening the continuously transposing head;
   (S3): setting a mode to determine whether each of transposing devices in the continuously transposing head is individually set or whether each of transposing devices is automatically set by a control program;
   (S4): inputting numerical values associated with the continuously transposed cable (CTC) to be produced in the case that each of transposing devices is automatically set by the control program in the step (S3);
   (S5): preparing the continuously transposing head;
   (S6): executing a RUN-mode;
   (S7): manufacturing the continuously transposed cable (CTC);
   (S8): detecting whether a problem occurs or not during the execution of the step (S7);
   (S9): activating a SYNC-mode in the case that a problem has been detected in the step (S8) or in the cast that the user wants to set individually each of transposing devices in the step (S3);
   (S10): setting each of transposing devices;
   (S11): storing a set value individually set for each of transposing devices; and
   (S12): storing total set values for all of transposing devices, in which the total set values is the sum of each of set values individually set;

wherein the step (S5) is performed after completing the step (S12) and whereby the continuously transposed cable (CTC) may be manufactured according to the order of the steps as mentioned above.

12. The method as claimed in claim 11, wherein the numerical values are the size, the number of strands, transposing pitch of wire that makes up the continuously transposed cable (CTC).

* * * * *